United States Patent
Evans et al.

(10) Patent No.: US 11,430,225 B2
(45) Date of Patent: Aug. 30, 2022

(54) IMAGE EMBEDDING FOR OBJECT TRACKING

(71) Applicant: Zoox, Inc., Foster City, CA (US)

(72) Inventors: Bryce A. Evans, San Mateo, CA (US); James William Vaisey Philbin, Palo Alto, CA (US); Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 148 days.

(21) Appl. No.: 17/088,447

(22) Filed: Nov. 3, 2020

(65) Prior Publication Data
US 2021/0142078 A1 May 13, 2021

Related U.S. Application Data

(63) Continuation of application No. 16/147,328, filed on Sep. 28, 2018, now Pat. No. 10,832,062.

(51) Int. Cl.
*G06K 9/62* (2022.01)
*G05D 1/02* (2020.01)
*G06V 20/58* (2022.01)

(52) U.S. Cl.
CPC .......... *G06V 20/58* (2022.01); *G05D 1/0246* (2013.01); *G06K 9/6215* (2013.01); *G06K 9/6255* (2013.01); *G06K 9/6256* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2017/0242442 A1* | 8/2017 | Minster | G06T 7/32 |
| 2018/0189574 A1* | 7/2018 | Brueckner | G06K 9/2081 |
| 2019/0065867 A1* | 2/2019 | Huang | G08G 1/167 |
| 2019/0236381 A1* | 8/2019 | Rochan Meganathan | G06T 7/97 |
| 2019/0265703 A1* | 8/2019 | Hicok | G05B 13/027 |
| 2019/0299983 A1* | 10/2019 | Shalev-Shwartz | G06Q 40/08 |
| 2019/0311546 A1* | 10/2019 | Tay | G01S 17/931 |
| 2019/0335100 A1* | 10/2019 | Chen | B60R 1/00 |
| 2020/0026960 A1* | 1/2020 | Park | G05D 1/0246 |

OTHER PUBLICATIONS

Non Final Office Action dated May 22, 2020 for U.S. Appl. No. 16/147,328, "Image Embedding for Object Matching", Evans, 84 pages.

* cited by examiner

*Primary Examiner* — Idowu O Osifade
(74) *Attorney, Agent, or Firm* — Lee & Hayes, P.C.

(57) ABSTRACT

Techniques are disclosed for implementing a neural network that outputs embeddings. Furthermore, techniques are disclosed for using sensor data to train a neural network to learn such embeddings. In some examples, the neural network may be trained to learn embeddings. The embeddings may be used for object identification, object matching, object classification, and/or object tracking in various examples.

20 Claims, 11 Drawing Sheets

IMAGE EMBEDDING FOR OBJECT TRACKING

CROSS REFERENCE TO RELATED APPLICATIONS

This is a continuation application which claims priority to commonly assigned, co-pending U.S. patent application Ser. No. 16/147,328, filed Sep. 28, 2018. Application Ser. No. 16/147,328 is fully incorporated herein by reference.

BACKGROUND

Various methods, apparatuses, and systems utilize image data from image sensors. For example, robotic platforms (e.g., autonomous vehicles) may use image data and/or other sensor data to track objects, e.g., to navigate through environments including obstacles, such as other vehicles, buildings, pedestrians, etc. In some examples, objects associated with a particular class may be tracked; however, tracking objects associated with multiple classes may present various challenges, such as inaccurately tracking objects temporally (e.g., from a first image frame associated with a first timestamp to a second image frame associated with a second timestamp) and/or spatially (e.g., across multiple cameras).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
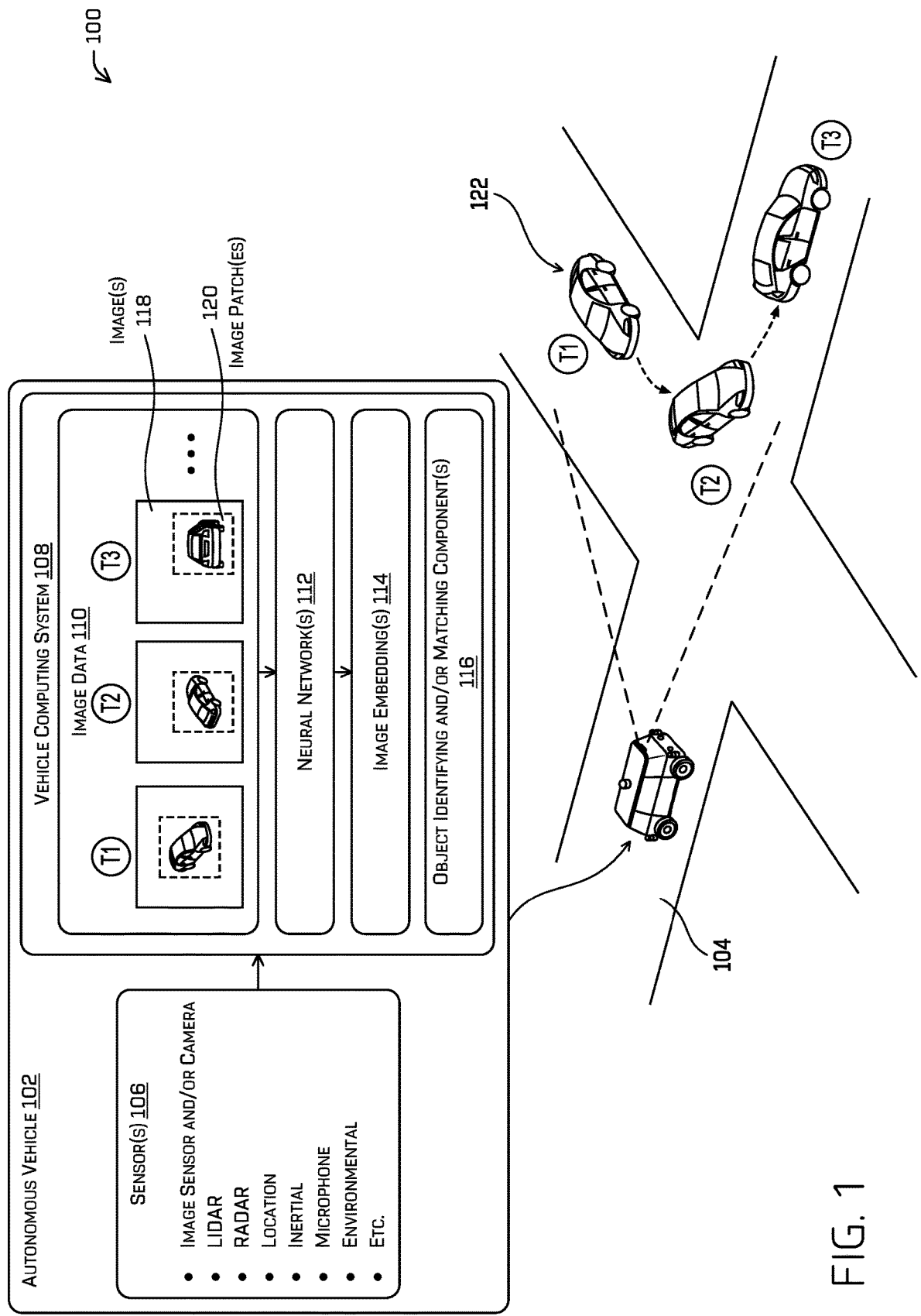
FIG. 1 illustrates an example environment that includes a vehicle having a neural network that outputs image embeddings that may be used to identify and/or match objects, in accordance with embodiments of the disclosure.

In some examples, objects associated with a particular class may be tracked (e.g., by a vehicle); however, tracking objects associated with multiple classes may present various challenges, such as inaccurately tracking objects temporally (e.g., from a first image frame associated with a first timestamp to a second image frame associated with a second timestamp) and/or spatially (e.g., across multiple cameras). This disclosure is directed to techniques for implementing a neural network that outputs image embeddings (e.g., image embeddings associated with multiple classes). Furthermore, this disclosure is directed to techniques for using image patches to train a neural network to learn image embeddings (e.g., image embeddings associated with multiple classes). In various examples, the image embeddings may be used for object identification, matching, and/or tracking.

In various embodiments, one or more sensors (e.g., one or more image sensors, one or more LIDAR sensors, one or more radar sensors, and/or one or more time-of-flight sensors, etc.) of a vehicle (e.g., an autonomous vehicle) may capture images of objects. A computing system of the vehicle may receive image data from the image sensors and input at least a portion of the image data (e.g., image patches) into a neural network. The neural network may be trained to learn image embeddings associated with multiple classes of objects (e.g., vehicles, bicycles, pedestrians, and/or drivable surfaces, etc.). As such, the neural network may output image embeddings, which may be associated with a spatial representation (e.g., a multidimensional unit sphere). According to some examples, an image patch may be used as an input to the neural network, and the neural network may output an associated image embedding, e.g., in the form of a vector. The vector may be represented by a point/location in the spatial representation associated with the image embeddings.

According to some embodiments, the computing system of the vehicle may determine, based at least in part on the image embeddings output from the neural network, an identity of one or more objects (e.g., a unique identifier for a particular object). Additionally, or alternatively, the computing system may determine, based at least in part on the image embeddings output from the neural network, whether an object matches another object. For example, the computing system may determine that a distance between embeddings associated with image patches may satisfy a threshold distance (e.g., a distance that is close to, or equal to, zero). Furthermore, the computing system may determine, based at least in part on the distances satisfying the threshold distance, that object detections associated with the image patches are associated with a same object (e.g., a same bicycle), a same class of object, or a different class of object.

The techniques discussed herein can improve a functioning of a computing device in a number of ways. For example, the techniques discussed herein may include training a neural network to learn image embeddings (and/or implementing the neural network), which may allow a computing device to track objects temporally and/or spatially more accurately. As such, the computing system of the vehicle, for example, may be able to improve its tracking of objects (e.g., obstacles) and its trajectory and/or route planning, e.g., to control movement of the vehicle to avoid colliding with obstacles. Furthermore, the techniques discussed herein may include training a neural network to learn image embeddings associated with multiple classes of objects (e.g., as opposed to training multiple neural networks to individually learn image embeddings associated with an individual class of object), which may increase the performance of a computing device by reducing latency and/or improving batching. These and other improvements to the functioning of the computing system are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform, manually driven vehicles, etc.), and is not limited to autonomous vehicles. In another example, the techniques can be utilized in an aviation or nautical context, or in any system using machine vision. Additionally, the techniques described herein can be used with real data (e.g., captured using sensor(s)), simulated data (e.g., generated by a simulator), or any combination of the two. Furthermore, the techniques described herein may utilize various other sensor data (e.g., LIDAR data, radar data, time-of-flight data, and/or depth image data, etc.)

FIG. 1 illustrates an example environment 100 that includes a vehicle 102 having a neural network that outputs image embeddings that may be used to identify and/or match objects, in accordance with embodiments of the disclosure. Though depicted as a separate network for illustrative purposes in FIG. 1, it is understood that such a network may form a subnetwork of a larger network trained to output an object identification, classification, and the like. In some examples, the environment 100 may include one or multiple features, components, and/or functionality of embodiments described herein with reference to FIGS. 2-12.

In some examples, the vehicle 102 may be configured to travel across a surface 104 (e.g., a road surface), for example, to transport people and/or cargo from a first location to a second location. For the purpose of illustration, the vehicle 102 may be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assistance during certain driving conditions, such as, for example, while operating on limited-access highways, but such that they require driver attention and/or assistance during other driving conditions, such as, for example, while operating on city streets in urban areas, or during at least some parking functions.

In some examples, the vehicle 102 may be an automobile having four wheels and respective tires for each of the wheels. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, or any combination thereof. In addition, although the example vehicle 102 may have four wheels, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end of the vehicle 102 may be in the front end of the vehicle 102 when traveling in a first direction, and such that the first end may become the rear end of the vehicle 102 when traveling in an opposite, second direction. Similarly, a second end of the vehicle 102 may be the front end of the vehicle 102 when traveling in the second direction, and the second end may become the rear end of the vehicle 102 when traveling in the opposite, first direction. These example characteristics may facilitate greater maneuverability, for example, in small spaces or crowded environments, such as parking lots and urban areas.

According to various embodiments, the vehicle 102 may include sensors 106. Furthermore, in various examples, the vehicle 102 may include a vehicle computing system 108. The vehicle computing system 108 may include one or more components that cause the vehicle computing system 108 and/or the vehicle 102 to perform various operations. In various embodiments, the vehicle computing system 108 may include image data 110, one or more neural networks 112, one or more image embeddings 114 (e.g., output from the neural network 112), and/or object identifying (and/or matching) component(s) 116. The image data 110 may include one or more images 118 and/or one or more image patches 120. In some examples, the vehicle computing system 108 may detect an object in an image 118 and generate a bounding box around the object in the image 118. Furthermore, the vehicle computing system 108 may crop the image 118 (e.g., along the bounding box, based on a pixelwise instance, etc.) to produce an image patch 120 that represents the detected object.

In some examples, a sensor 106 (e.g., an image sensor) of the vehicle 102 may capture one or more images of a scene. In a non-limiting example, the sensor 106 may capture images of a scene in which another vehicle 122 is turning at an intersection. For example, the vehicle computing system 108 may attempt to track the other vehicle 122 based at least in part on the images captured by the sensor 106. As indicated in FIG. 1, the sensor 106 may capture a first image associated with the other vehicle 122 at a first time (T1). Additionally, or alternatively, the sensor 106 may capture a second image associated with the other vehicle 122 at a second time (T2). Additionally, or alternatively, the sensor 106 may capture a third image associated with the other vehicle 122 at a third time (T3). In some examples, the image data 110 may include images 118 and image patches 120 associated with the other vehicle 122 and its orientation (from the perspective of the image sensor 106 of the vehicle 102) at each of times T1, T2, and T3, as indicated in FIG. 1. As will be discussed in further detail herein, the image data 110, the neural network(s) 112, the image embedding(s) 114, and/or the object identifying (and/or matching) component(s) 116 may be used to determine that the image captures of the other vehicle 122 at T1, T2, and T3 are associated with the same object (the other vehicle 122), despite the transformation in appearance of the other vehicle 122 (e.g., as it rotates while making the turn) from the perspective of the vehicle 102.

According to some embodiments, the image data 110 may be used as inputs to the neural network(s) 112. The neural network 112 may be trained to learn image embeddings (e.g. an N-dimensional vector representation of a portion of data), e.g., as described herein with reference to FIGS. 3-5D, 7, 10, and 11. As such, the neural network 112 may output image embedding(s) 114, which may be associated with a spatial representation (e.g., image embedding spatial representation 304 described herein with reference to FIG. 3), such as a unit sphere. In some non-limiting examples, the neural network(s) 112 may be trained to learn image embeddings associated with multiple classes of objects (e.g., vehicles, bicycles, pedestrians, and/or drivable surfaces, etc.). According to some implementations, an image patch 120 may be used as an input to the neural network 112, and the neural network(s) 112 may output an associated image embedding 114, e.g., in the form of a vector. The vector may be represented by a point/location in the spatial representation associated with the image embedding(s) 114.

As a non-limiting example, the vehicle computing system 108 may input, into a neural network 112, image patches 120 associated with T1, T2, and T3. The image patches 120 may be input as part of a same batch in some examples. In other examples, some of the image patches 120 may be input as part of one or more different batches (e.g., batches that are input at different times). The neural network 112 may output, for each of the image patches 120, a respective image embedding 114. The neural network 112 may output, based at least in part on the image patch 120 associated with T1, a first point in the spatial representation associated with the image embedding(s) 114. Furthermore, the neural network 112 may output, based at least in part on the image patch 120 associated with T2, a second point in the spatial representation. Similarly, the neural network 112 may output, based at least in part on the image patch 120 associated with T3, a third point in the spatial representation.

According to some embodiments, the object identifying and/or matching component(s) 116 may determine, based at least in part on the image embeddings 114 output from the neural network 112, an identity of one or more objects (e.g., a unique identifier for a particular object). Additionally, or alternatively, the object identifying and/or matching component(s) 116 may determine, based at least in part on the image embeddings 114 output from the neural network 112, whether an object matches another object. For example, the object identifying and/or matching component(s) 116 may determine that distances between the points associated with the image patches 120 at T1, T2, and T3 (the first point, the second point, and the third point, respectively) may satisfy a threshold distance (e.g., a distance that is close to, or equal to, zero). Furthermore, the object identifying and/or matching component(s) 116 may determine, based at least in part on the distances satisfying the threshold distance, that object detections associated with the image patches 120 at T1, T2, and T3 are associated with a same object (e.g., the other vehicle 122).

In some embodiments, the sensor(s) 106 may include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. The sensor(s) 106 can generate sensor data, which can be utilized by vehicle computing system 108 associated with the vehicle 102.

Figure 2:
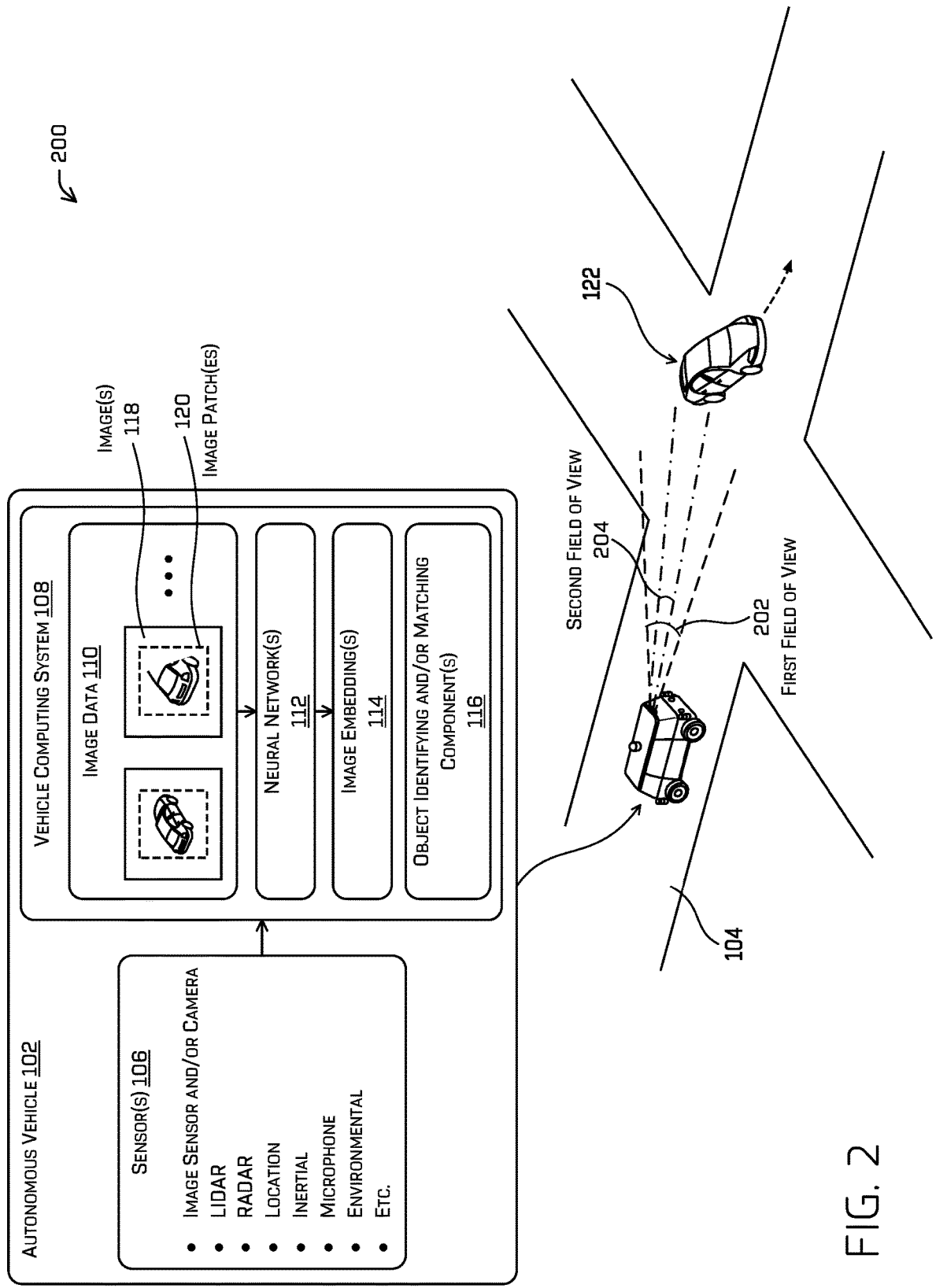
FIG. 2 illustrates another example environment that includes a vehicle having a neural network that outputs image embeddings that may be used to identify and/or match objects, in accordance with embodiments of the disclosure.

FIG. 2 illustrates another example environment 200 that includes a vehicle 102 having a neural network that outputs image embeddings that may be used to identify and/or match objects, in accordance with embodiments of the disclosure. In some examples, the environment 200 may include one or multiple features, components, and/or functionality of embodiments described herein with reference to FIGS. 1 and 3-12.

In some embodiments, the vehicle 102 may use multiple sensors 106 to capture images 118 of objects (e.g., the other vehicle 122). In a non-limiting example, the sensors 106 may include a first image sensor and a second image sensor. As indicated in FIG. 2, the first image sensor may have a first field of view 202, and the second image sensor may have a second field of view 204 that is different than the first field of view. In some non-limiting embodiments, the first image sensor may be part of a first camera having a wide-angle lens. Furthermore, in some non-limiting embodiments, the second image sensor may be part of a second camera having a telephoto lens.

In a non-limiting example, the first image sensor may capture a first image 118 of the other vehicle 122 while the vehicle is turning at an intersection, and the second image sensor may capture a second image 118 of the other vehicle 122. For example, the first image 118 and the second image 118 may be captured substantially contemporaneously. The image data 110 may include images 118 and image patches 120 associated with image captures of the other vehicle 122 using each of the first sensor (having the first field of view 202) and the second sensor (having the second field of view 204), as indicated in FIG. 2. As will be discussed in further detail herein, the image data 110, the neural network(s) 112, the image embedding(s) 114, and/or the object identifying (and/or matching) component(s) 116 may be used to determine that the image captures of the other vehicle 122 are associated with the same object (the other vehicle 122).

According to some examples, the vehicle computing system 108 may input, into a neural network 112, image patches 120 associated with the image captures performed by the first image sensor and the second image sensor. The neural network 112 may output, for each of the image patches 120, a respective image embedding 114. The neural network 112 may output, based at least in part on the image patch 120 associated with the image capture performed by the first image sensor, a first point in the spatial representation associated with the image embedding(s) 114. Furthermore, the neural network 112 may output, based at least in part on the image patch 120 associated with the image capture performed by the second image sensor, a second point in the spatial representation. In some examples, the object identifying and/or matching component(s) 116 may determine that a distance between the first point and the second point may satisfy a threshold distance (e.g., a distance that is close to, or equal to, zero). Furthermore, the object identifying and/or matching component(s) 116 may determine, based at least in part on the distance satisfying the threshold distance, that object detections associated with the image patches 120 match. That is, the object identifying and/or matching component(s) 116 may determine that object detections associated with the image patches 120 (produced from the image 118 captured via the first image sensor and the image 118 captured via the second image sensor) are associated with a same object (e.g., the other vehicle 122). Though illustrated in FIG. 2 with respect to two differing sensors having a same position and orientation, this is merely for illustrative purposes. Of course, it is understood that such such sensors (e.g., cameras) may be facing different directions and/or correspond to differing times such that a unique object may be identified and/or tracked in accordance with the techniques described herein. As a non-limiting example, as the vehicle 102 passes an object in the road, the object may be first observed by cameras in the front of the vehicle 102, then cameras on the side of vehicle 102, and then cameras in the rear of vehicle 102. Techniques as described herein would allow the vehicle 102 to track the object as the object passes from one camera to the next.

Figure 3:
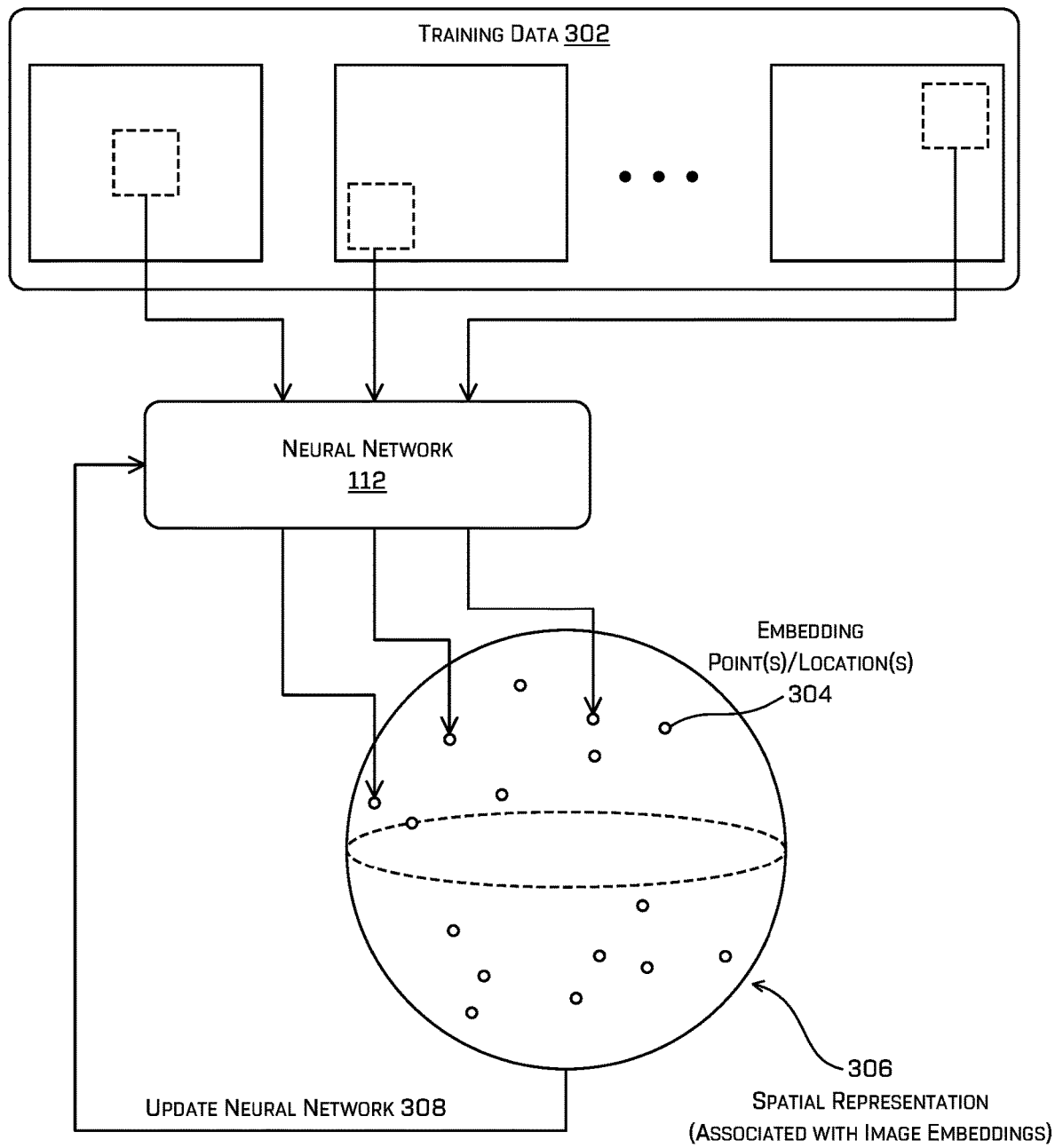
FIG. 3 is a schematic diagram illustrating an example of training a neural network to learn image embeddings, in accordance with embodiments of the disclosure.

FIG. 3 is a schematic diagram illustrating an example 300 of training a neural network to learn image embeddings, in accordance with embodiments of the disclosure. In some examples, the example 300 may include one or multiple features, components, and/or functionality of embodiments described herein with reference to FIGS. 1, 2, and 4-12.

In various examples, training data 302 may be used as inputs into a neural network 112. For example, the training data 302 may include images and/or image patches, e.g., as described herein with reference to FIGS. 1, 2, and 4-11. In some examples, the training data 302 may include image patches that are produced based at least in part on images captured by a vehicle (e.g., the vehicle 102 described herein with reference to FIGS. 1 and 2).

In some embodiments, the neural network 112 may be trained to learn image embeddings (e.g., the image embedding(s) 114 described herein with reference to FIGS. 1 and 2). The image embeddings may be associated with multiple classes of objects. As a non-limiting example, the classes of objects may include vehicles, bicycles, pedestrians, and/or drivable surfaces, etc.

In various embodiments, the neural network 112 may be trained to output, based at least in part on the training data 302, image embeddings associated with embedding point(s)/location(s) 304 in a spatial representation 306. In some examples, the image embeddings output from the neural network 112 may be normalized to the spatial representation 306. As a non-limiting example, the spatial representation 306 may be a unit sphere, and the image embeddings may be normalized such that each image embedding is associated with an embedding point 304 on the surface of the unit sphere.

As indicated in FIG. 3, the example 300 may include updating 308 the neural network 112. For example, the neural network 112 may be updated 308 based on an evaluation of the image embeddings. In some examples, the neural network may be updated to minimize one or more loss functions (e.g., a hinge loss) associated with the image embeddings.

Figure 4:
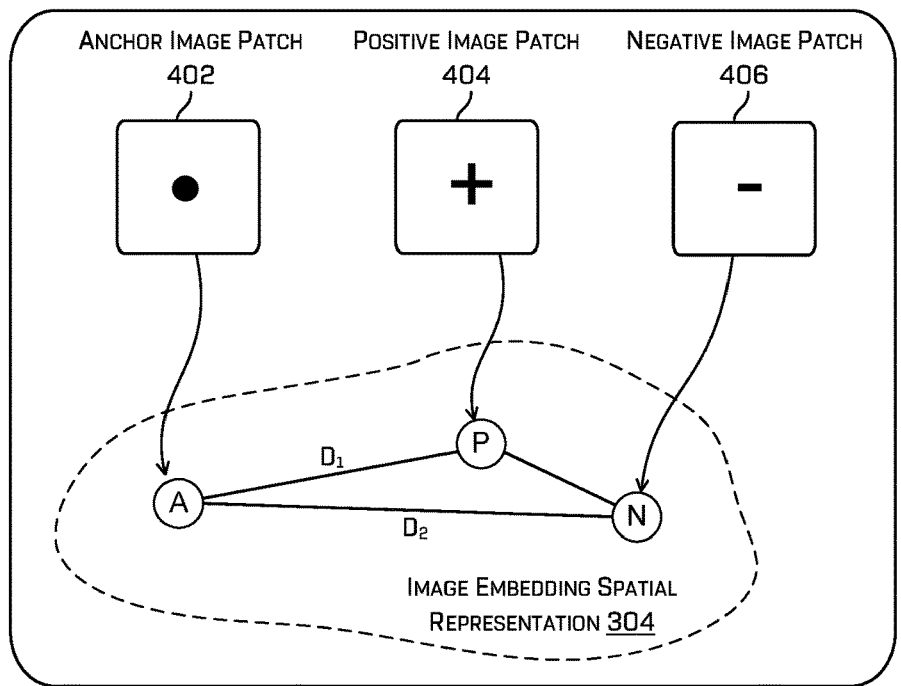
FIG. 4 is a schematic diagram illustrating an example of training a neural network with a group of image patches that can be used to update the neural network, in accordance with embodiments of the disclosure.
Figure 4:
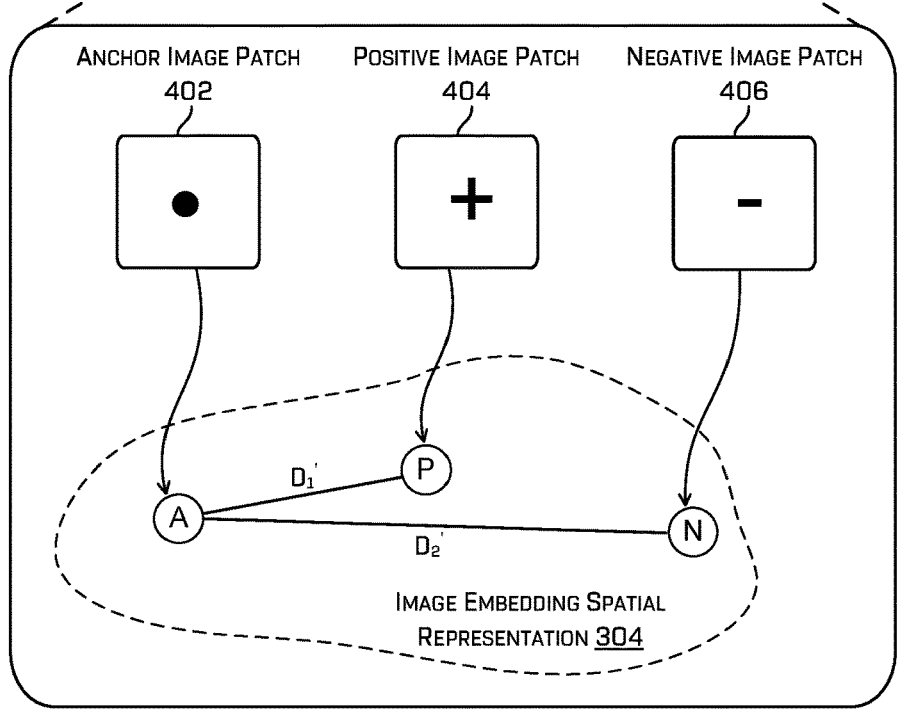

FIG. 4 is a schematic diagram illustrating an example 400 of training a neural network with a group of image patches that can be used to update the neural network, in accordance with embodiments of the disclosure. In some examples, the example 400 may include one or multiple features, components, and/or functionality of embodiments described herein with reference to FIGS. 1-3 and 5-12.

In the example 400, the group of image patches includes an anchor image patch 402, a positive image patch 404, and/or a negative image patch 406. In various examples, the anchor image patch 402 and the positive image patch 404 may have a same identity. For example, the anchor image patch 402 and the positive image patch 404 may be associated with a first object, though the patches themselves may differ (e.g., images of the object having slightly different views, perspectives, lighting, etc.). Since the two images represent the same object, the distance between such embeddings should be low. Furthermore, the anchor image patch 402 and the negative image patch 406 may have a different identity. For example, the negative image patch may be associated with a second object that is different than the first object. In such an example, the distance between the embeddings associated with the anchor and the negative patches may be high. The combination of the anchor image patch 402, the positive image patch 404, and the negative image patch 406 may be considered a "triplet" group of image patches. As will be discussed in further detail herein, the neural network may be updated 408 based at least in part on a triplet loss that minimizes the distance between the anchor image patch 402 and the positive image patch 404, and that maximizes the distance between the anchor image patch 402 and the negative image patch 406.

As indicated in FIG. 4, the anchor image patch 402 may be associated with an embedding point A in the spatial representation 304 associated with the image embeddings output from the neural network. The positive image patch 404 may be associated with an embedding point P in the spatial representation. Furthermore, the negative image patch 406 may be associated with an embedding point N in the spatial representation.

Embedding point A (associated with the anchor image patch 402) may be at a distance $D_1$ from embedding point P (associated with the positive image patch 404). Furthermore, embedding point A may be at a distance $D_2$ from embedding point N (associated with the negative image patch 406). In various examples, embedding point P may be closer to embedding point A, than embedding point N is to embedding point A. That is, distance $D_1$ may be less than distance $D_2$. In some examples, the group of image patches may be selected such that a distance between the embedding point P and the embedding point N satisfies a threshold margin. For example, the threshold margin may be a low value such that the neural network may be trained based at least in part on "hard" groups of image patches, which may include, e.g., a triplet group of image patches in which the negative image patch 406 has appearance attributes that are difficult to discern from those of the positive image patch 404. Other methods are contemplated (e.g., by only training embeddings to be close to positive examples, far from negative examples, and the like).

According to various examples, the neural network may be updated 408 to minimize one or more loss functions associated with the image embeddings. In some examples, the neural network may be updated 408 based at least in part on a triplet loss that minimizes the distance ($D_1$) between the anchor image patch 402 and the positive image patch 404, and that maximizes the distance ($D_2$) between the anchor image patch 402 and the negative image patch 406. As indicated in FIG. 4, the neural network may be updated 408 such that embedding point P (associated with the positive image patch 404) is pushed towards embedding point A (associated with the anchor image patch 402) in the spatial representation 304, and embedding point N (associated with the negative image patch 406) is pushed away from embedding point A in the spatial representation 304. Based on the update 408, embedding point A may be at a distance $D_1'$ from embedding point P. Distance $D_1'$ may be less than distance $D_1$. Furthermore, based on the update 408, embedding point A may be at a distance $D_2'$ from embedding point N. Distance $D_2'$ may be greater than distance $D_2$.

While FIG. 4 illustrates an example of training a neural network with a group of image patches, it should be understood that the neural network may be trained on multiple groups of images and/or image patches in various embodiments.

FIGS. 5A-5D illustrate respective examples 500a-500d of training image patches that may be used to train a neural network to learn image embeddings, in accordance with embodiments of the disclosure. In some examples, the example 500a may include one or multiple features, components, and/or functionality of embodiments described herein with reference to FIGS. 1-4 and 5B-12. Furthermore, in some examples, the example 500b may include one or multiple features, components, and/or functionality of embodiments described herein with reference to FIGS. 1-5A and 5C-12. Additionally, in some examples, the example 500c may include one or multiple features, components, and/or functionality of embodiments described herein with reference to FIGS. 1-5B and 5D-12. Moreover, in some examples, the example 500d may include one or multiple features, components, and/or functionality of embodiments described herein with reference to FIGS. 1-5C and 6-12.

Figure 5A:
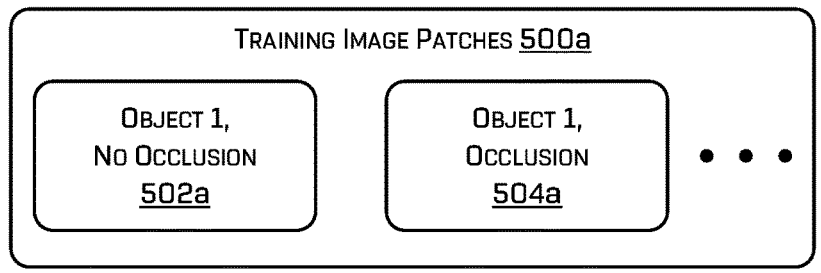
FIGS. 5A-5D illustrate respective examples of training image patches that may be used to train a neural network to learn image embeddings, in accordance with embodiments of the disclosure.

As indicated in FIG. 5A, the neural network may be trained (e.g., to learn image embeddings) using training image patches 500a that include a first image patch 502a (object 1, no occlusion) and a second image patch 504a (object 1, occlusion). The first image patch 502a may represent an object (e.g., a vehicle) that is not occluded. The second image patch 502a may represent the same object, where the object is at least partially occluded (e.g., the vehicle is partially occluded by another vehicle, a street sign, and/or a tree, etc.).

Figure 5B:
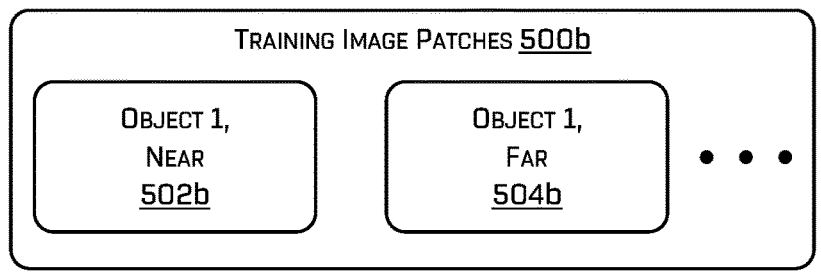

Additionally, or alternatively, the neural network may be trained (e.g., to learn image embeddings) using training image patches 500b, as indicated in FIG. 5B. The training image patches 500b may include a first image patch 502b (object 1, near) and a second image patch 504b (object 1, far). The first image patch 502b may represent an object having a near appearance. As a non-limiting example, the first image patch 502b may have been captured using a camera that has a telephoto lens. The second image patch 504b may represent the same object having a far appearance. As a non-limiting example, the second image patch 504b may have been captured using a camera that has a wide-angle lens.

Figure 5C:
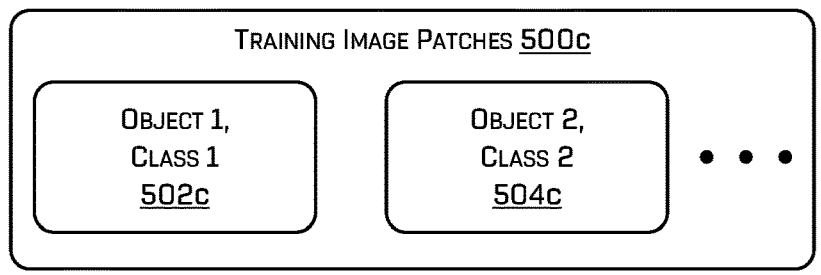

Additionally, or alternatively, the neural network may be trained (e.g., to learn image embeddings) using training image patches 500c, as indicated in FIG. 5C. The training image patches 500c may include a first image patch 502c (object 1, class 1) and a second image patch 504c (object 2, class 2). The first image patch 502c may represent a first object (e.g., a compact car) associated with a first class of objects (e.g., vehicles). The second image patch 504c may represent a different, second object (e.g., a person) associated with a second class of objects (e.g., pedestrians) that is different than the first class of objects.

Figure 5D:
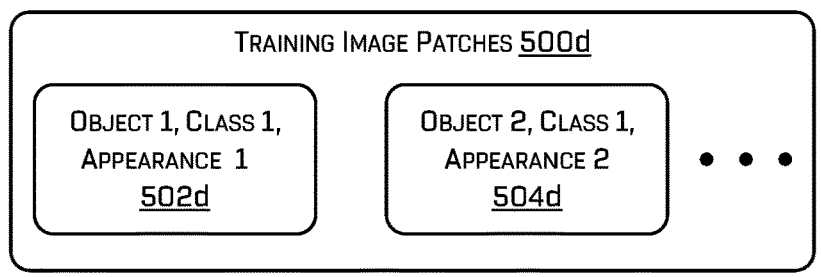

Additionally, or alternatively, the neural network may be trained (e.g., to learn image embeddings) using training image patches 500d, as indicated in FIG. 5D. The training image patches 500d may include a first image patch 502d (object 1, class 1, appearance 1) and a second image patch 504d (object 2, class 1, appearance 2). The first image patch 502d may represent a first object (e.g., a first truck) associated with a class of objects (e.g., vehicles) and a first group of one or more appearance attributes (e.g., shape, size, color, and/or orientation, etc.). The second image patch 504c may represent a different, second object (e.g., a second truck) associated with a same class of objects (e.g., vehicles) and a second group of one or more appearance attributes that is at least partially different than the first set of appearance attributes. As a non-limiting example, the first image patch 502d may represent blue truck, and the second image patch 504d may represent a red truck.

Figure 6:
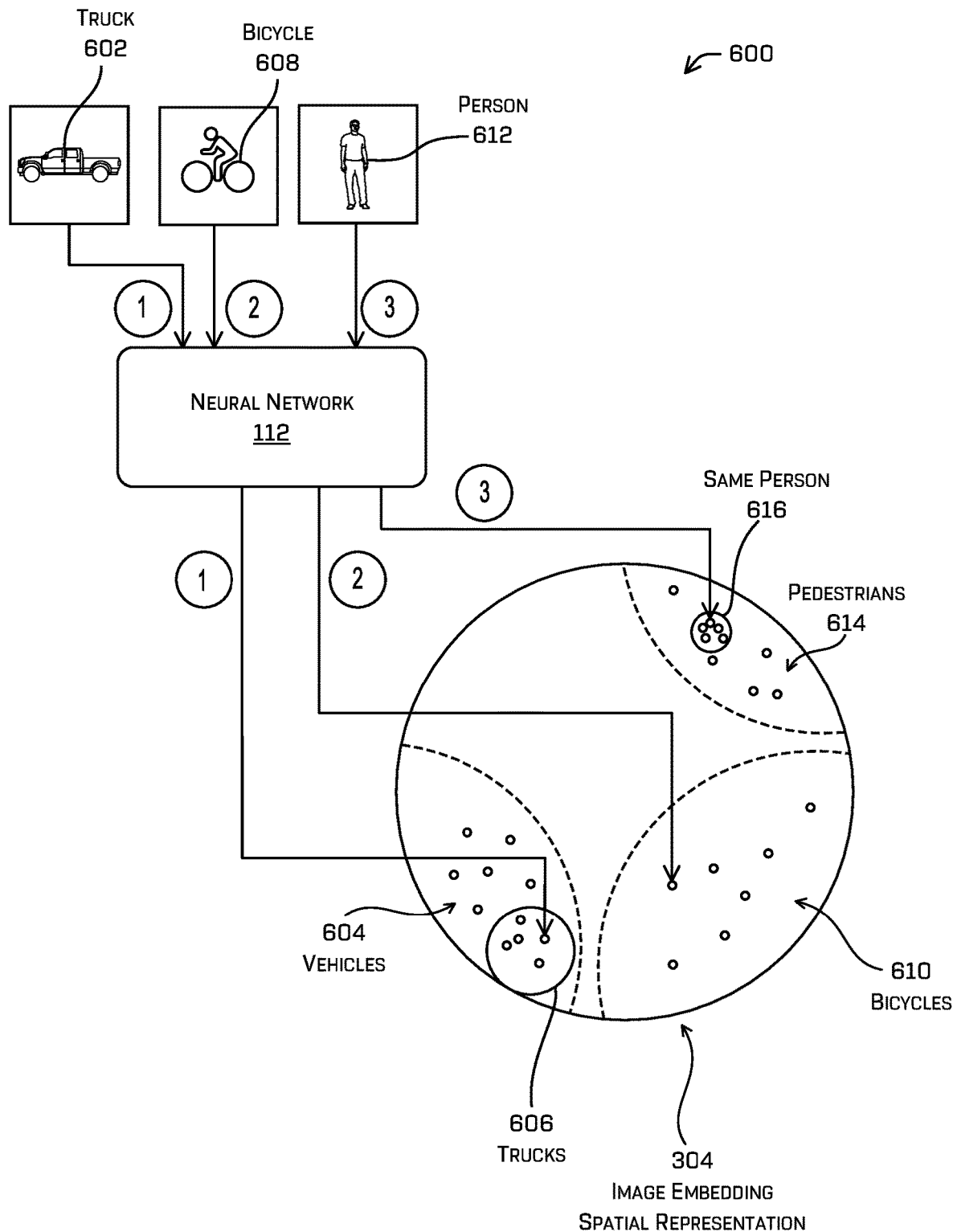
FIG. 6 is a schematic diagram illustrating an example of implementing a neural network that outputs image embeddings associated with multiple classes of objects, in accordance with embodiments of the disclosure.

FIG. 6 is a schematic diagram illustrating an example 600 of implementing a neural network that outputs image embeddings associated with multiple classes of objects, in accordance with embodiments of the disclosure. In some examples, the example 600 may include one or multiple features, components, and/or functionality of embodiments described herein with reference to FIGS. 1-5D and 7-12.

In various embodiments, the example 600 may include image patches that are passed through the neural network 112, and the neural network 112 may output image embeddings associated with multiple classes of objects. The image embeddings may be associated with embedding points in a spatial representation 304. As indicated in FIG. 6, the embedding points in the spatial representation 304 may form clusters that may be used to identify objects and/or to match (or otherwise associate) objects with one another.

In a non-limiting example, the neural network 112 may receive, as input, a first image patch representing a truck 602. The neural network 112 may output a first embedding point located within a cluster of embedding points that is associated with vehicles 604 (which may be one of the multiple classes of objects). Additionally, or alternatively, the first embedding point may be located within a cluster of embedding points that is associated with trucks 606.

In a non-limiting example, the neural network 112 may receive, as input, a second image patch representing a bicycle 608. The neural network 112 may output a second embedding point located within a cluster of embedding points that is associated with bicycles 610 (which may be one of the multiple classes of objects).

In a non-limiting example, the neural network 112 may receive, as input, a third image patch representing a person 612. The neural network 112 may output a third embedding point located within a cluster of embedding points that is associated with pedestrians 614 (which may be one of the multiple classes of objects). Additionally, or alternatively, the first embedding point may be located within a cluster of embedding points that is associated with the same person 616. Such clusters may be determined, for example, using k-means, or the like. Identification of a unique object may comprise determining that a distance between detections is below a threshold.

Figure 7:
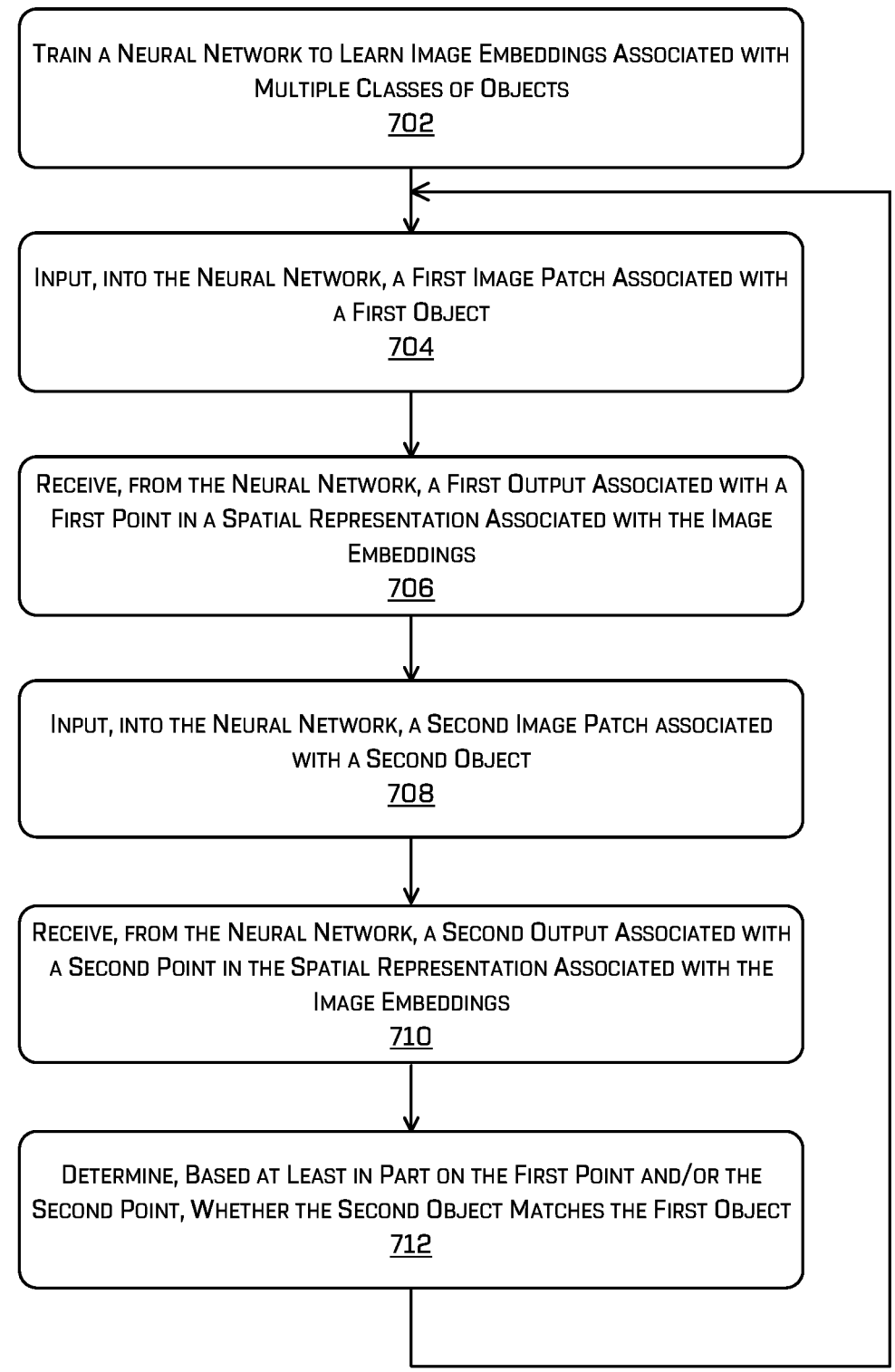
FIG. 7 is a flow chart illustrating an example process for implementing a neural network that outputs image embeddings that may be used to determine whether an object matches another object, in accordance with embodiments of the disclosure.

FIG. 7 is a flow chart illustrating an example process 700 for implementing a neural network that outputs image embeddings that may be used to determine an identity of an object, in accordance with embodiments of the disclosure. In some examples, the process 700 may include one or multiple features, components, and/or functionality of embodiments described herein with reference to FIGS. 1-6 and 8-12.

At 702, the process 700 may include training a neural network. For example, the neural network may be trained to learn image embeddings associated with multiple classes of objects, e.g., as described herein with reference to FIGS. 3-5D, 10, and 11.

At 704, the process 700 may include inputting, into the neural network, a first image patch associated with a first object. In some examples, the first image patch may be associated with a first image that represents the first object. For example, the first image may be captured via a first image sensor. The first image may be cropped to generate the first image patch, e.g., as described herein with reference to FIG. 9.

At 706, the process 700 may include receiving, from the neural network, a first output associated with a first point in a spatial representation associated with the image embeddings. For example, the first output may be received from the neural network based at least in part on the first image patch.

At 708, the process 700 may include inputting, into the neural network, a second image patch associated with a second object. In some examples, the second image patch may be associated with a second image that represents the second object. For example, the second image may be captured via the first image sensor or a second image sensor. In some examples, the first image sensor may have a first field of view, and the second image sensor may have a second field of view that is different than the first field of view. As a non-limiting example, the second field of view may be smaller than the first field of view. In some examples, the first image may be received from an image sensor during a first time period, and the second image may be received from the image sensor during a second time period that is different than the first time period.

At 710, the process 700 may include receiving, from the neural network, a second output associated with a second point in the spatial representation associated with the image embeddings. For example, the second output may be received from the neural network based at least in part on the second image patch.

At 712, the process 700 may include determining whether the second object matches the first object (e.g., whether the second object is the first object). In some examples, an identity of the first object and/or the second object may be determined based at least in part on the first point and/or the second point in the spatial representation associated with the image embeddings. As a non-limiting example, determining an identity of the first object and/or the second object may include determining a class of objects for the first object and/or the second object.

Figure 8:
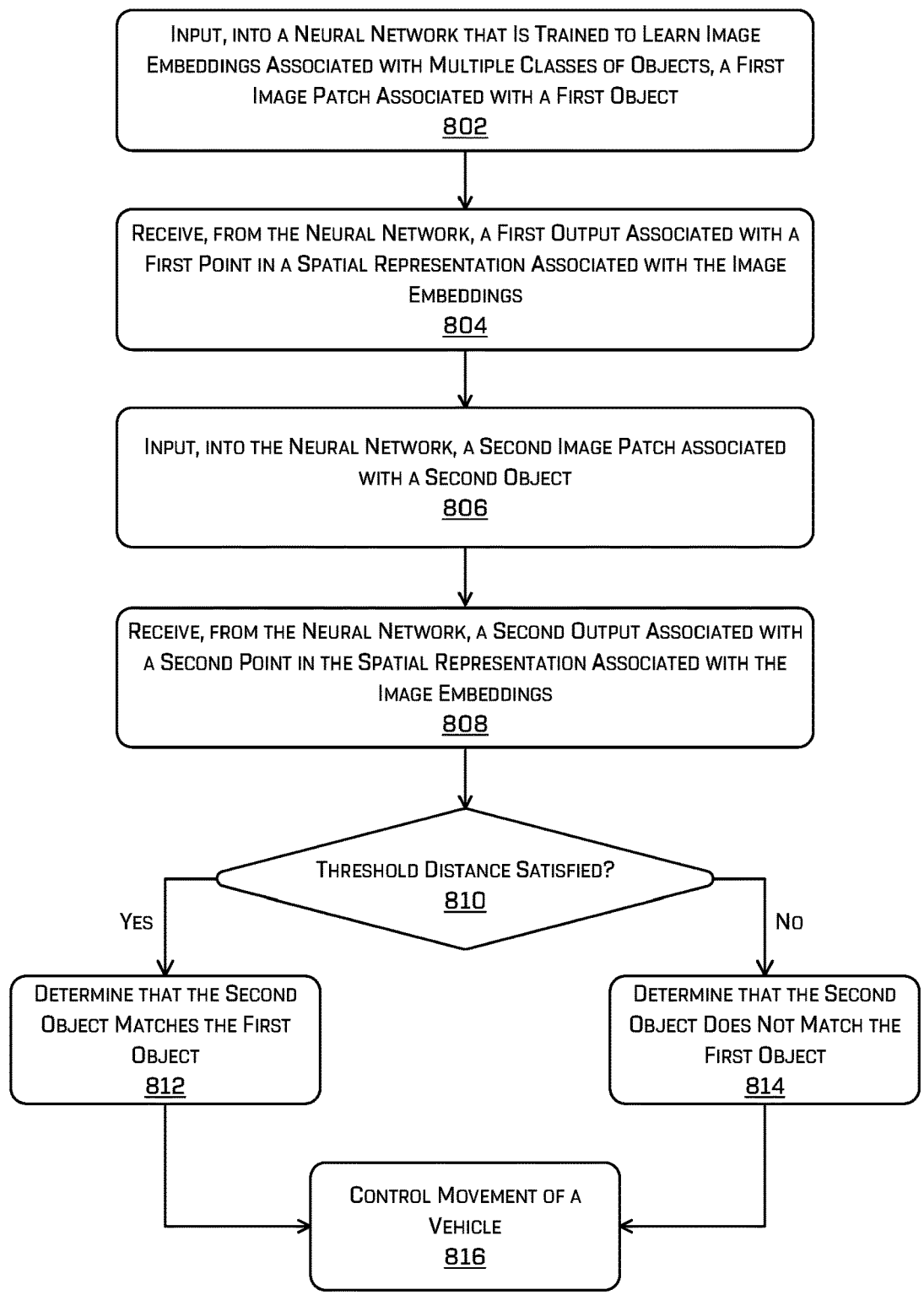
FIG. 8 is a flow chart illustrating another example process for implementing a neural network that outputs image embeddings that may be used to determine whether an object matches another object, in accordance with embodiments of the disclosure.

FIG. 8 is a flow chart illustrating an example process 800 for implementing a neural network that outputs image embeddings that may be used to determine whether an object matches another object, in accordance with embodiments of the disclosure. In some examples, the process 800 may include one or multiple features, components, and/or functionality of embodiments described herein with reference to FIGS. 1-7 and 9-12.

At 802, the process 800 may include inputting, into a neural network, a first image patch associated with a first object. The neural network may be trained to learn image embeddings associated with multiple classes of objects. In some examples, the first image patch may be associated with a first image that represents the first object. For example, the first image may be captured via a first image sensor. The first image may be cropped to generate the first image patch, e.g., as described herein with reference to FIG. 9.

At 804, the process 800 may include receiving, from the neural network, a first output associated with a first point in a representation (e.g., an embedding, which may be a spatial representation) associated with the image embeddings. For example, the first output may be received from the neural network based at least in part on the first image patch.

At 806, the process 800 may include inputting, into the neural network, a second image patch associated with a second object. In some examples, the second image patch may be associated with a second image that represents the second object. For example, the second image may be captured via the first image sensor or a second image sensor. In some examples, the first image sensor may have a first field of view, and the second image sensor may have a second field of view that is different than the first field of view. As a non-limiting example, the second field of view may be smaller than the first field of view. In some examples, the first image may be received from an image sensor during a first time period, and the second image may be received from the image sensor during a second time period that is different than the first time period.

At 808, the process 800 may include receiving, from the neural network, a second output associated with a second point in the representation associated with the image embeddings. For example, the second output may be received from the neural network based at least in part on the second image patch.

At 810, the process 800 may include determining whether a threshold distance is satisfied. For example, it may be determined whether a distance between the first point and the second point satisfies the threshold distance. If, at 810, it is determined that the threshold distance is satisfied (e.g., the distance is less than or equal to the threshold distance), then the process 800 may include determining that the second object matches the first object (at 812). If, at 810, it is determined that the threshold distance is not satisfied, then the process 800 may include determining that the second object does not match the first object (at 814). In some examples, the process 800 may include identifying, based at least in part on the first point and/or the second point, a class of object to assign to the first object and/or the second object.

At 814, the process 800 may include controlling movement of a vehicle (e.g., an autonomous vehicle). For example, movement of the vehicle may be controlled based at least in part on a determination that the second object matches the first object (at 812) and/or a determination that the second object does not match the first object (at 814). As a non-limiting example, if the object matches (e.g., it is the same object), an object track can be determined (e.g., including an estimate of object velocity) and, ultimately, yield a better prediction for motion of the detected object to use for planning the vehicle. If, on the other hand, the object does not match, the vehicle 102 may proceed with more caution and/or create a new track.

Figure 9:
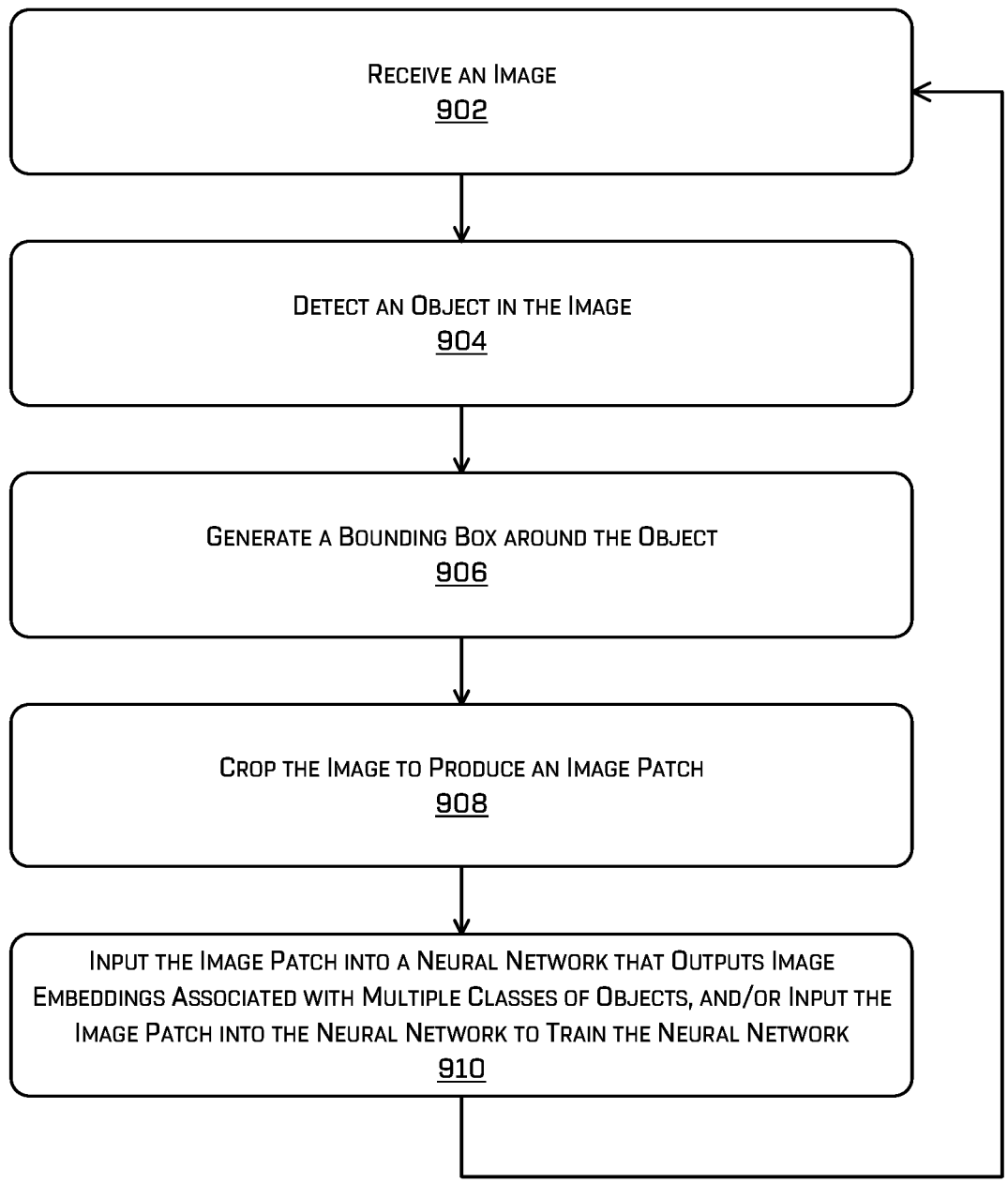
FIG. 9 is a flow chart illustrating an example process for producing an image patch that may be input into a neural network that outputs image embeddings, in accordance with embodiments of the disclosure.

FIG. 9 is a flow chart illustrating an example process 900 for producing an image patch that may be input into a neural network that outputs image embeddings, in accordance with embodiments of the disclosure. In some examples, the process 900 may include one or multiple features, components, and/or functionality of embodiments described herein with reference to FIGS. 1-8 and 10-12.

At 902, the process 900 may include receiving an image. At 904, the process 900 may include detecting an object in the image. At 906, the process 900 may include generating a bounding box around the object. At 908, the process 900 may include cropping the image to produce an image patch. For example, the image may be cropped along the bounding box to produce the image patch. The image patch may represent the object. In some examples, the image patch may be rescaled to a certain size. Furthermore, in some examples, the process 900 may include producing multiple image patches from multiple images, and rescaling each of the image patches to the same size prior to inputting the image patches into the neural network.

At 910, the process 900 may include inputting the image patch into a neural network. For example, the neural network may be trained to learn image embeddings associated with multiple classes of objects. In some examples, the image patch may be inputted into the neural network to train the neural network to learn image embeddings associated with multiple classes of objects.

Figure 10:
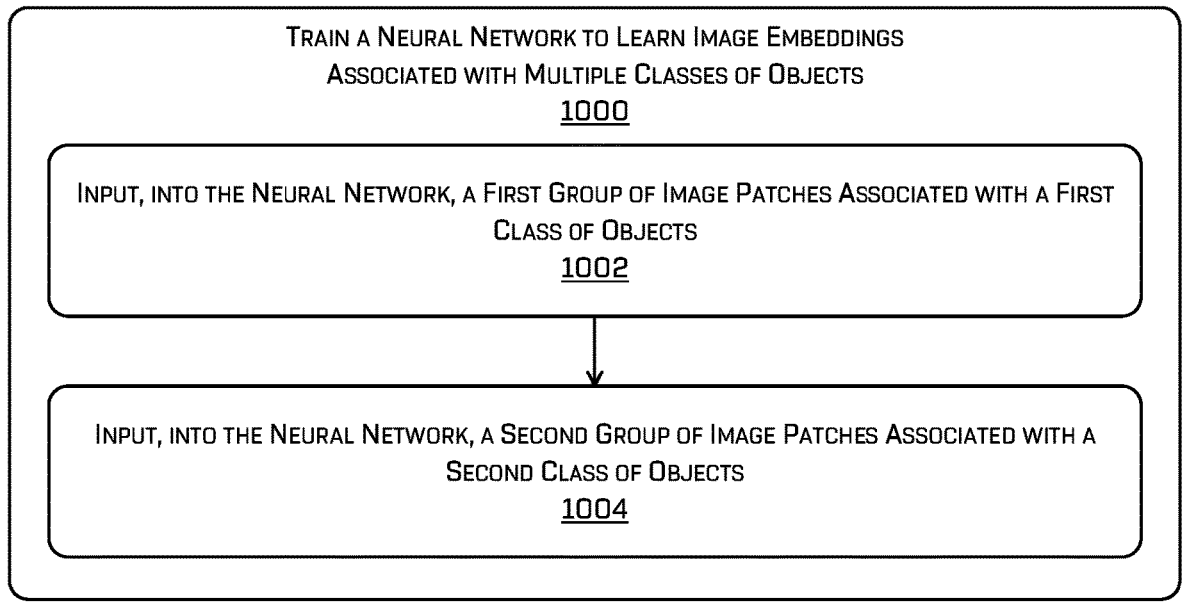
FIG. 10 is a flow chart illustrating an example process for training a neural network to learn image embeddings associated with multiple classes of objects, in accordance with embodiments of the disclosure.

FIG. 10 is a flow chart illustrating an example process 1000 for training a neural network to learn image embeddings associated with multiple classes of objects, in accordance with embodiments of the disclosure. In some examples, the process 1000 may include one or multiple features, components, and/or functionality of embodiments described herein with reference to FIGS. 1-9, 11, and 12.

At 1002, the process 1000 may include inputting, into the neural network, a first group of image patches associated with a first class of objects. As a non-limiting example, the first group of image patches may be associated with a first class of objects defined as "bicycles."

At 1004, the process 1000 may include inputting, into the neural network, a second group of image patches associated with a second class of objects. The second class of objects may be different than the first class of objects. As a non-limiting example, the second group of image patches may be associated with a second class of objects defined as "pedestrians." In some examples, the first group of image patches and the second group of image patches may be part of a same batch for input into the neural network. In other embodiments, the first group of image patches and the second group of image patches may be part of different batches for input into the neural network.

Figure 11:
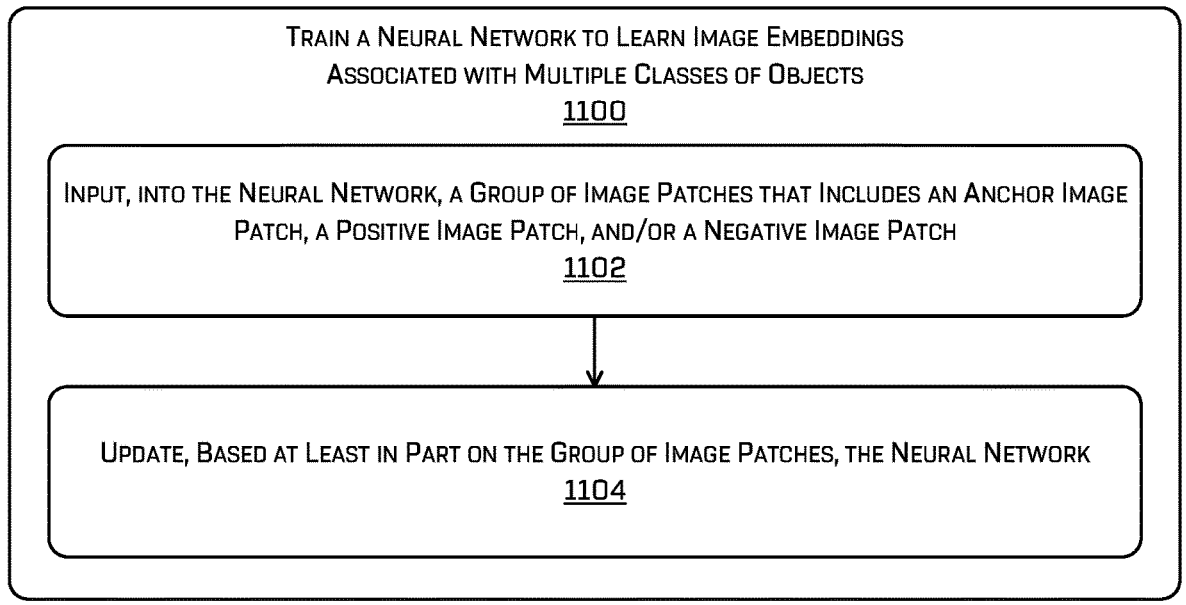
FIG. 11 is a flow chart illustrating another example process for training a neural network to learn image embeddings associated with multiple classes of objects, in accordance with embodiments of the disclosure.

FIG. 11 is a flow chart illustrating another example process 1100 for training a neural network to learn image embeddings associated with multiple classes of object, in accordance with embodiments of the disclosure. In some examples, the process 1100 may include one or multiple features, components, and/or functionality of embodiments described herein with reference to FIGS. 1-10 and 12.

At 1102, the process 1100 may include inputting, into the neural network, a group of image patches. In some examples, the group of image patches may include an anchor image patch, a positive image patch, and/or a negative image patch. In a non-limiting example, the group of image patches may comprise a triplet group of image patches that includes the anchor image patch, the positive image patch, and the negative image patch.

The anchor image patch may represent a first object and may be associated with a first point in a spatial representation associated with the image embeddings. The positive image patch may represent the first object and may be associated with a second point in the spatial representation associated with the image embeddings. The negative image patch may represent a second object that is different than the first object. Furthermore, the negative image patch may be associated with a third point in the spatial representation associated with the image embeddings. In some examples, a first distance, from the third point associated with the negative image patch to the first point associated with the anchor image patch, may be greater than a second distance from the second point associated with the positive image patch to the first point associated with the anchor image patch.

At 1104, the process 1100 may include updating, based at least in part on the group of image patches, the neural network. In some examples, the neural network may be updated to minimize one or more loss functions (e.g., a hinge loss) associated with the image embeddings. For example, the neural network may be updated to increase the first distance from the third point associated with the negative image patch to the first point associated with the anchor image patch, and/or to decrease the second distance from the second point associated with the positive image patch to the first point associated with the anchor image patch.

Figure 12:
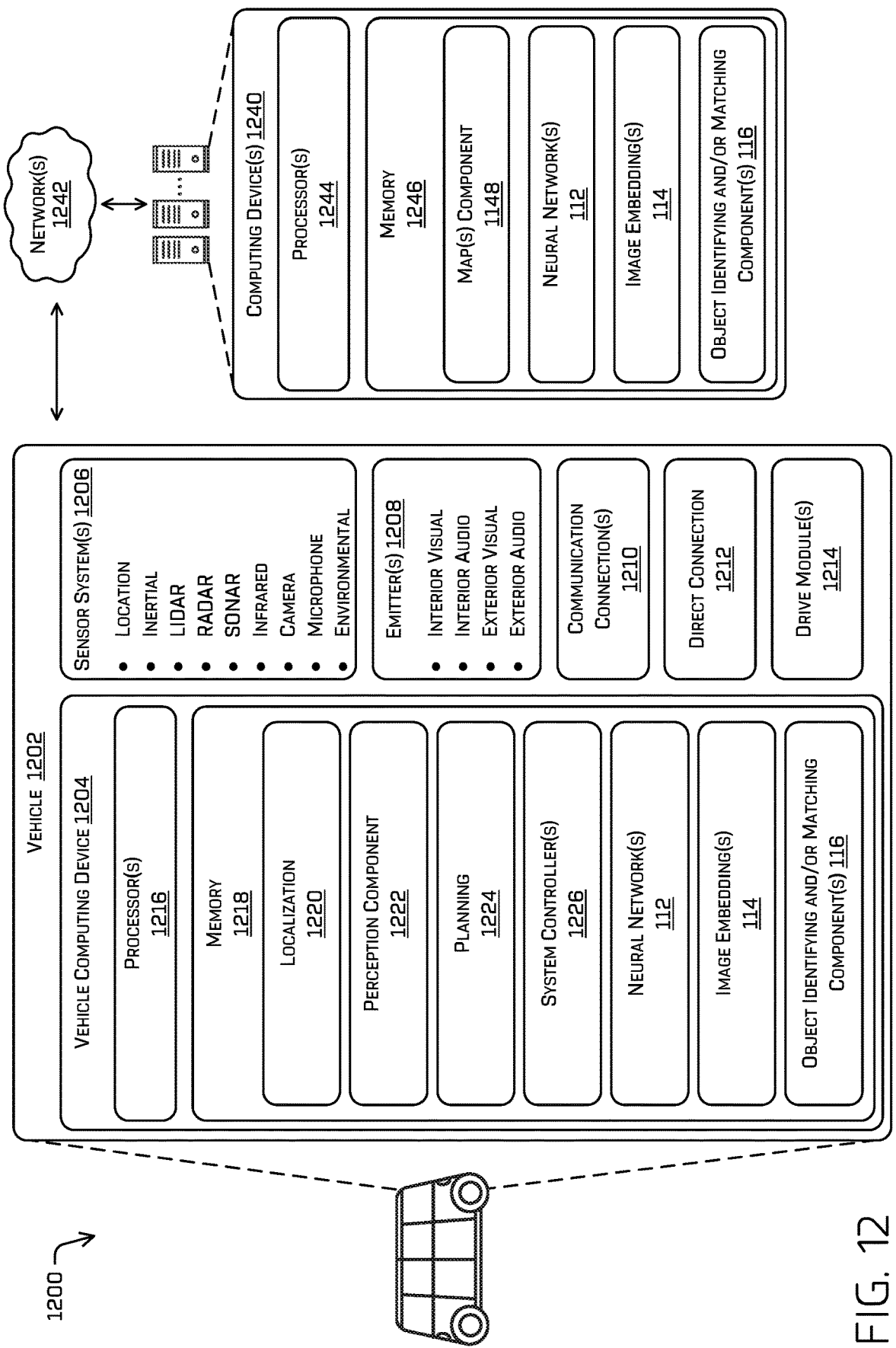
FIG. 12 is a block diagram of an example system for implementing the techniques described herein, in accordance with embodiments of the disclosure.

FIG. 12 is a block diagram of an example system 1200 for implementing the techniques described herein, in accordance with embodiments of the disclosure. In some examples, the system 1200 may include one or multiple features, components, and/or functionality of embodiments described herein with reference to FIGS. 1-11.

In some embodiments, the system 1200 may include a vehicle 1202 (e.g., the vehicle 102 described herein with reference to FIG. 1). The vehicle 1202 may include a vehicle computing device 1204, one or more sensor systems 1206, one or more emitters 1208, one or more communication connections 1210, at least one direct connection 1212, and one or more drive modules 1214.

The vehicle computing device 1204 can include one or more processors 1216 and memory 1218 communicatively coupled with the one or more processors 1216. In the illustrated example, the vehicle 1202 is an autonomous vehicle; however, the vehicle 1202 could be any other type of vehicle, or any other system having at least an image capture device (e.g., a camera enabled smartphone). In the illustrated example, the memory 1218 of the vehicle computing device 1204 stores a localization component 1220, a perception component 1222, a planning component 1224, one or more system controllers 1226, the neural network(s) 112, the image embedding(s) 114, and/or the object identifying (and/or matching) component(s) 116. Though depicted in FIG. 12 as residing in the memory 1218 for illustrative purposes, it is contemplated that the localization component 1220, the perception component 1222, the planning component 1224, the one or more system controllers 1226, the neural network(s) 112, the image embedding(s) 114, and/or the object identifying (and/or matching) component(s) 116 can additionally, or alternatively, be accessible to the vehicle 1202 (e.g., stored on, or otherwise accessible by, memory remote from the vehicle 1202). In some instances, the vehicle computing device(s) 1204 can correspond to the vehicle computing system 108 of FIG. 1.

In at least one example, the localization component 1220 can include functionality to receive data from the sensor system(s) 1206 to determine a position and/or orientation of the vehicle 1202 (e.g., one or more of an x-, y-, z-position, roll, pitch, or yaw). For example, the localization component 1220 can include and/or request/receive a map of an environment and can continuously determine a location and/or orientation of the autonomous vehicle within the map. In some instances, the localization component 1220 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 1220 can provide data to various components of the vehicle 1202 to determine an initial position of an autonomous vehicle for generating a trajectory and/or for determining to retrieve map data including an occlusion grid from memory, as discussed herein.

In some instances, the perception component 1222 can include functionality to perform object detection, segmentation, and/or classification. In some examples, the perception component 1222 can provide processed sensor data that indicates a presence of an entity that is proximate to the vehicle 1202 and/or a classification of the entity as an entity type (e.g., car, pedestrian, cyclist, animal, building, tree, road surface, curb, sidewalk, unknown, etc.). In additional and/or alternative examples, the perception component 1222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 1224 can determine a path for the vehicle 1202 to follow to traverse through an environment. For example, the planning component 1224 can determine various routes and trajectories and various levels of detail. For example, the planning component 1224 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 1224 can generate an instruction for guiding the autonomous vehicle along at least a portion of the route from the first location to the second location. In at least one example, the planning component 1224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 1202 to navigate.

In some examples, the planning component 1224 can use temporal logic, such as linear temporal logic and/or signal temporal logic, to evaluate one or more trajectories of the vehicle 1202. Details of utilizing temporal logic in the planning component 1224 are discussed in U.S. application Ser. No. 15/632,147, which is herein incorporated by reference, in its entirety.

In at least one example, the vehicle computing device 1204 can include one or more system controllers 1226, which can be configured to control steering, propulsion, braking, safety, emitters, communication, and other systems of the vehicle 1202. These system controller(s) 1226 can communicate with and/or control corresponding systems of the drive module(s) 1214 and/or other components of the vehicle 1202.

The memory 1218 can further include one or more maps (not shown) that can be used by the vehicle 1202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 1202 can be controlled based at least in part on the maps. That is, the maps can be used in connection with the localization component 1220, the perception component 1222, and/or the planning component 1224 to determine a location of the vehicle 1202, identify objects in an environment, and/or generate routes and/or trajectories to navigate within an environment.

In some examples, the one or more maps can be stored on a remote computing device(s) (such as the computing device(s) 1240) accessible via network(s) 1242. In some examples, multiple maps can be stored based on, for example, a characteristic (e.g., type of entity, time of day, day of week, season of the year, etc.). Storing multiple maps can have similar memory requirements, but increase the speed at which data in a map can be accessed.

In some instances, aspects of some or all of the components discussed herein can include any models, algorithms, and/or machine learning algorithms. For example, in some instances, the components in the memory 1218 (and the memory 1246, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve×Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 1206 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1206 can include multiple instances of each of these or other types of sensors. For instance, the LIDAR sensors can include individual LIDAR sensors located at the corners, front, back, sides, and/or top of the vehicle 1202. As another example, the camera sensors can include multiple cameras disposed at various locations about the exterior and/or interior of the vehicle 1202. The sensor system(s) 1206 can provide input to the vehicle computing device 1204. Additionally, or alternatively, the sensor system(s) 1206 can send sensor data, via the one or more networks 1246, to the one or more computing device(s) at a particular frequency, after a lapse of a predetermined period of time, in near real-time, etc. In some instances, the sensor system(s) 1206 can correspond to the sensor(s) 106 of FIG. 1.

The vehicle 1202 can also include one or more emitters 1208 for emitting light and/or sound, as described above. The emitters 1208 in this example include interior audio and visual emitters to communicate with passengers of the vehicle 1202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1202 can also include one or more communication connection(s) 1210 that enable communication between the vehicle 1202 and one or more other local or remote computing device(s). For instance, the communication connection(s) 1210 can facilitate communication with other local computing device(s) on the vehicle 1202 and/or the drive module(s) 1214. Also, the communication connection(s) 1210 can allow the vehicle to communicate with other nearby computing device(s) (e.g., other nearby vehicles, traffic signals, etc.). The communications connection(s) 1210 also enable the vehicle 1202 to communicate with a remote teleoperations computing device or other remote services.

The communications connection(s) 1210 can include physical and/or logical interfaces for connecting the vehicle computing device 1204 to another computing device or a network, such as network(s) 1242. For example, the communications connection(s) 1210 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle 1202 can include one or more drive modules 1214. In some examples, the vehicle 1202 can have a single drive module 1214. In at least one example, if the vehicle 1202 has multiple drive modules 1214, individual drive modules 1214 can be positioned on opposite ends of the vehicle 1202 (e.g., the front and the rear, etc.). In at least one example, the drive module(s) 1214 can include one or more sensor systems to detect conditions of the drive module(s) 1214 and/or the surroundings of the vehicle 1202. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 1214. In some cases, the sensor system(s) on the drive module(s) 1214 can overlap or supplement corresponding systems of the vehicle 1202 (e.g., sensor system(s) 1206).

The drive module(s) 1214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 1214 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 1214. Furthermore, the drive module(s) 1214 also include one or more communication connection(s) that enable communication by the respective drive module with one or more other local or remote computing device(s).

In at least one example, the direct connection 1212 can provide a physical interface to couple the one or more drive module(s) 1214 with the body of the vehicle 1202. For example, the direct connection 1212 can allow the transfer of energy, fluids, air, data, etc. between the drive module(s) 1214 and the vehicle. In some instances, the direct connection 1212 can further releasably secure the drive module(s) 1214 to the body of the vehicle 1202.

In at least one example, the components discussed herein can process sensor data, as described above, and can send their respective outputs, over the one or more network(s) 1242, to one or more computing device(s) 1240. In at least one example, the components discussed herein can send their respective outputs to the one or more computing device(s) 1240 at a particular frequency, after a lapse of a predetermined period of time, in near real-time, etc.

In some examples, the vehicle 1202 can send sensor data to one or more computing device(s) 1240 via the network(s) 1242. In some examples, the vehicle 1202 can send raw sensor data to the computing device(s) 1240. In other examples, the vehicle 1202 can send processed sensor data and/or representations of sensor data to the computing device(s) 1240. In some examples, the vehicle 1202 can send sensor data to the computing device(s) 1240 at a particular frequency, after a lapse of a predetermined period of time, in near real-time, etc. In some cases, the vehicle 1202 can send sensor data (raw or processed) to the computing device(s) 1240 as one or more log files.

The computing device(s) 1240 can include processor(s) 1244 and a memory 1246 storing a maps(s) component 1248, the neural network(s) 112, the image embedding(s) 114, and/or the object identifying (and/or matching) component(s) 116.

The processor(s) 1216 of the vehicle 1202 and the processor(s) 1244 of the computing device(s) 1240 can be any suitable processor capable of executing instructions to process data and perform operations as described herein. By way of example and not limitation, the processor(s) 1216 and 1244 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 1218 and 1246 are examples of non-transitory computer-readable media. The memory 1218 and 1246 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information.

The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 12 is illustrated as a distributed system, in alternative examples, components of the vehicle 1202 can be associated with the computing device(s) 1240 and/or components of the computing device(s) 1240 can be associated with the vehicle 1202. That is, the vehicle 1202 can perform one or more of the functions associated with the computing device(s) 1240, and vice versa. Further, aspects of the neural network(s) 112, the image embedding(s) 114, and/or the object identifying (and/or matching) component(s) 116 can be performed on any of the devices discussed herein.

FIGS. 7-11 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A system comprising: one or more processors; and one or more non-transitory computer-readable media storing instructions executable by the one or more processors, wherein the instructions, when executed, cause the one or more processors to perform operations comprising: receiving a first image comprising a first object; determining a first image patch of the first image, the first image patch comprising at least a portion of the first object; inputting the first image patch into a neural network trained to output an image embedding; receiving, from the neural network and based at least in part on the first image patch, a first output associated with a first image embedding; receiving a second image comprising a second object; determining a second image patch of the second image, the second image patch comprising at least a portion of the second object; inputting the second image patch into the neural network; receiving, from the neural network, a second output associated with a second image embedding; determining a distance between the first image embedding and the second image embedding; and determining, based at least in part on the distance, whether the first object is the second object.

B. The system as paragraph A recites, wherein: the receiving the first image comprises: receiving the first image from a first image sensor associated with a first field of view; and the receiving the second image comprises: receiving the second image from a second image sensor associated with a second field of view that is different than the first field of view.

C. The system as either paragraph A or B recites, wherein: the receiving the first image occurs during a first time period; and the receiving the second image occurs during a second time period that is different than the first time period.

D. The system as any one of paragraphs A-C recites, the operations further comprising: training the neural network, the training comprising: inputting a triplet group of image patches into the neural network, the triplet group of image patches comprising: an anchor image patch representing a third object, the anchor image patch associated with a third image embedding; a positive image patch representing the third object, the positive image patch associated with a fourth image embedding; and a negative image patch representing a fourth object that is different than the third object, the negative image patch associated with a fifth image embedding; wherein a first distance, from the fifth image embedding to the third image embedding, is greater than a second distance from the fourth image embedding to the third image embedding.

E. The system as any one of paragraphs A-D recites, wherein: the system comprises an autonomous vehicle; and the operations further comprise: determining that the distance is below a threshold distance; determining, based at least in part on the distance being below the threshold distance, that the second object is the first object; and controlling, based at least in part on the determining that the second object is the first object, movement of the autonomous vehicle.

F. A computer-implemented method comprising: inputting a first subset of data into a neural network trained to output embeddings associated with multiple classes of objects, the first subset of data associated with a first object; receiving, from the neural network and based at least in part on the first subset of data, a first embedding; inputting a second subset of data into the neural network, the second subset of data associated with a second object; receiving, from the neural network and based at least in part on the second subset of data, a second embedding; and determining, based at least in part on a distance between the first embedding and the second embedding, whether the second object is the first object.

G. The computer-implemented method as paragraph F recites, further comprising: receiving a first image; and detecting the first object in the first image; wherein the first subset of data comprises a portion of the first image associated with the first object.

H. The computer-implemented method as either paragraph F or G recites, further comprising: determining that the distance between the first embedding and the second embedding satisfies a threshold distance; wherein the determining whether the second object is the first object comprises: determining, based at least in part on the determining that the distance satisfies the threshold distance, that the second object is the first object.

I. The computer-implemented method as any one of paragraphs F-H recites, further comprising: receiving, from a first sensor, first data that represents the first object; generating, based at least in part on the first data, the first subset of data; receiving, from a second sensor, second data that represents the second object; and generating, based at least in part on the second data, the second subset of data.

J. The computer-implemented method as paragraph I recites, wherein: the first sensor is associated with a first field of view; and the second sensor is associated with a second field of view that is different than the first field of view.

K. The computer-implemented method as any one of paragraphs F-J recites, further comprising: receiving, from a sensor and during a first time period, first data that represents the first object; generating, based at least in part on the first data, the first subset of data; receiving, from the and during a second time period that is different than the first time period, second data that represents the second object; and generating, based at least in part on the second data, the second subset of data.

L. The computer-implemented method as any one of paragraphs F-K recites, further comprising: training the neural network, the training comprising: inputting a first group of image patches into the neural network, the first group of image patches associated with a first class of objects; and inputting a second group of image patches into the neural network, the second group of image patches associated with a second class of objects that is different than the first class of objects.

M. The computer-implemented method as paragraph L recites, wherein the first group of image patches comprises: an anchor image patch associated with a third object; a positive image patch associated with the third object; and a negative image patch associated with a fourth object that is different than the third object.

N. The computer-implemented method as paragraph M recites, wherein: the anchor image patch is associated with a third embedding; the positive image patch is associated with a fourth embedding; the fourth embedding associated with the positive image patch is at a first distance from the third embedding associated with the anchor image patch; the negative image patch is associated with a fifth embedding; the fifth embedding associated with the negative image patch is at a second distance from the third embedding associated with the anchor image patch, the second distance greater than the first distance; and the fifth embedding associated with the negative image patch is at a third distance from the fourth embedding associated with the positive image patch, the third distance satisfying a threshold margin.

O. The computer-implemented method as paragraph N recites, wherein the training the neural network further comprises: updating the neural network such that: first distance, from the fifth embedding associated with the negative image patch to the third embedding associated with the anchor image patch, is increased; and the second distance, from the fourth embedding associated with the positive image patch to the third embedding associated with the anchor image patch, is decreased.

P. The computer-implemented method as any one of paragraphs F-O recites, wherein: the first subset of data is associated with a first image captured by a first image sensor of an autonomous vehicle; the second subset of data is associated with a second image captured by the first image sensor or a second image sensor of the autonomous vehicle; and the computer-implemented method further comprises: determining that the distance is below a threshold distance; determining, based at least in part on the distance being below the threshold distance, that the second object is the first object; and controlling, based at least in part on the determining that the second object is the first object, movement of the autonomous vehicle.

Q. One or more non-transitory computer-readable media storing instructions executable by one or more processors, wherein the instructions, when executed, cause the one or more processors to perform operations comprising: inputting a subset of data into a neural network that outputs embeddings associated with multiple classes of objects, the subset of data associated with an object; receiving, from the neural network and based at least in part on the first subset of data, an output associated with an embedding; identifying, from the multiple classes of objects and based at least in part on the embedding, a particular class to assign to the object; and controlling, based at least in part on the identifying the particular class to assign to the object, movement of a vehicle.

R. The one or more non-transitory computer-readable media as paragraph Q recites, wherein: the subset of data is a first subset of data; the output is a first output associated with a first embedding; the vehicle comprises an autonomous vehicle; and the operations further comprise: receiving, from a first sensor of the autonomous vehicle, first data that represents the first object, the first sensor associated with a first field of view; generating, based at least in part on the first data, the first subset of data; receiving, from a second sensor of the autonomous vehicle, second data that represents a second object, the second sensor associated with a second field of view that is different than the first field of view; generating, based at least in part on the second data, a second subset of data associated with the second object; inputting the second subset of data into the neural network; receiving, from the neural network and based at least in part on the second subset of data, a second output associated with a second embedding; and determining, based at least in part on a distance between the first embedding and the second embedding, whether the second object is the first object.

S. The one or more non-transitory computer-readable media as either paragraph Q or R recites, wherein: the subset of data is a first subset of data; the output is a first output associated with a first embedding; the vehicle comprises an autonomous vehicle; and the operations further comprise: receiving, from a sensor of the autonomous vehicle and during a first time period, first data that represents the first object; generating, based at least in part on the first data, the first subset of data; receiving, from the sensor and during a second time period that is different than the first time period, second data that represents a second object; generating, based at least in part on the second data, a second subset of data associated with the second object; inputting the second subset of data into the neural network; receiving, from the neural network and based at least in part on the second subset of data, a second output associated with a second embedding; and determining, based at least in part on a distance between the first embedding and the second embedding, whether the second object is the first object.

T. The one or more non-transitory computer-readable media as any one of paragraphs Q-S recites, the operations further comprising: training the neural network, the training comprising: inputting, into the neural network, a first group of image patches associated with a first class of objects, the first group of image patches comprising: an anchor image patch associated with a third object and a first group of one or more appearance attributes; a positive image patch associated with the third object and a second group of one or more appearance attributes that is different, at least in part, than the first group of one or more appearance attributes; and a negative image patch associated with a fourth object that is different than the third object; and inputting, into the neural network, a second group of image patches associated with a second class of objects that is different than the first class of objects.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more non-transitory computer-readable media storing instructions executable by the one or more processors, wherein the instructions, when executed, cause the one or more processors to perform operations comprising:
  tracking an object in an environment associated with a vehicle, wherein the tracking comprises:
    receiving a first image representing a first object in the environment;
    inputting a first image portion associated with the first image into a neural network;
    receiving, from the neural network and based at least in part on the first image portion, a first multi-dimensional vector associated with the first object;
    receiving a second image representing a second object in the environment;
    inputting a second image portion associated with the second image into the neural network;
    receiving, from the neural network, a second multi-dimensional vector associated with the second object; and
    determining, based at least in part on the first multi-dimensional vector and the second multi-dimensional vector, that the first object represented in the first image corresponds to the second object represented in the second image; and
  controlling, based at least in part on the tracking, the vehicle.
2. The system of claim 1, wherein:
the receiving the first image comprises:
  receiving the first image from a first camera associated with a first field of view; and the receiving the second image comprises:
    receiving the second image from a second camera associated with a second field of view that is different than the first field of view.
3. The system of claim 1, wherein:
the receiving the first image comprises:
    receiving, during a first time period, the first image from a camera; and
the receiving the second image comprises:
    receiving, during a second time period that is different than the first time period, the second image from the camera.
4. The system of claim 1, the operations further comprising:
    training the neural network, the training comprising:
        inputting a triplet group of image portions into the neural network, the triplet group of image portions comprising:
            a third image portion representing a portion of a third object, the third image portion associated with a third multi-dimensional vector;
            a fourth image portion representing a portion of a fourth object, the fourth image portion associated with a fourth multi-dimensional vector, wherein the fourth object represents one of i) a different portion of the third object; ii) a different perspective of the third object; or iii) a same classification as the third object; and
            a fifth image portion representing a fifth object that is different than the third object and the fourth object, the fifth image portion associated with a fifth multi-dimensional vector; and
        adjusting one or more parameters of the neural network to increase a first distance between the fifth multi-dimensional vector and the third multi-dimensional vector and to decrease a second distance between the fourth multi-dimensional vector and the third multi-dimensional vector.
5. The system of claim 1, wherein:
the tracking further comprises:
    determining that a distance between the first multi-dimensional vector and the second multi-dimensional vector is below a threshold distance;
    determining, based at least in part on the distance being below the threshold distance, that the second object corresponds to the first object;
    determining, based at least in part on the second object corresponding to the first object, at least one of an orientation of the first object, a classification of the first object, a velocity of the first object, or an acceleration of the first object; and
the controlling comprises:
    controlling, based at least in part on the determining that the second object corresponds to the first object, the vehicle.
6. A computer-implemented method comprising:
receiving, from a first sensor associated with a vehicle, first data;
determining, based at least in part on the first data, a first subset of data associated with a first object;
inputting the first subset of data into a neural network;
receiving, from the neural network and based at least in part on the first subset of data, a first n-dimensional representation;
receiving, from a second sensor associated with the vehicle, second data;
determining, based at least in part on the second data, a second subset of data associated with a second object;
inputting the second subset of data into the neural network, wherein the second subset of data is associated with a second object;
receiving, from the neural network and based at least in part on the second subset of data, a second n-dimensional representation;
determining, based at least in part on a distance between the first n-dimensional representation and the second n-dimensional representation, that the second object corresponds to the first object;
determining, based at least in part on the second object corresponding to the first object, a velocity and an orientation of the first object; and
controlling the vehicle based at least in part on one or more of the velocity or the orientation of the first object.
7. The computer-implemented method of claim 6, wherein the receiving the first data comprises:
    receiving, from an image sensor, a first image; and
the computer-implemented method further comprises:
    detecting the first object in the first image;
    wherein the first subset of data comprises a portion of the first image associated with the first object.
8. The computer-implemented method of claim 6, further comprising:
    determining that the distance between the first n-dimensional representation and the second n-dimensional representation satisfies a threshold distance;
    wherein the determining that the second object corresponds to the first object comprises:
        determining that the second object is the first object.
9. The computer-implemented method of claim 6, wherein:
    the first sensor comprises a first image sensor of the vehicle; and
    the second sensor comprises a second image sensor of the vehicle.
10. The computer-implemented method of claim 6, wherein:
    the first sensor is associated with a first field of view; and
    the second sensor is associated with a second field of view that is different than the first field of view.
11. The computer-implemented method of claim 6, wherein:
    the first n-dimensional representation comprises a first vector and the second n-dimensional representation comprises a second vector; and
    the computer-implemented method further comprises determining a classification of the first object based at least in part on the first vector.
12. The computer-implemented method of claim 6, wherein determining the first subset of data is based at least in part on at least one of a bounding box associated with the first object represented in the first data or a pixelwise segmentation associated with the first object represented in the first data.
13. The computer-implemented method of claim 6, further comprising:
    training the neural network, the training comprising:
        inputting a triplet group of image portions into the neural network, the triplet group of image portions comprising:
            a first image portion representing a portion of a third object, the first image portion associated with a third n-dimensional representation;

a second image portion representing a portion of a fourth object, the second image portion associated with a fourth n-dimensional representation; and a third image portion representing a fifth object that is different than the third object and the fourth object, the third image portion associated with a fifth n-dimensional representation; and adjusting a parameter of the neural network to one or more of increase a first distance from the fifth n-dimensional representation to the third n-dimensional representation or decrease a second distance from the fourth n-dimensional representation to the third n-dimensional representation.

14. The computer-implemented method of claim 13, wherein the fourth object represents one of:
a different portion of the third object;
a different perspective of the third object; or
a same classification as the third object.

15. The computer-implemented method of claim 6, further comprising:
predicting a motion of the first object based at least in part on determining that the second object corresponds to the first object,
wherein controlling the vehicle is further based at least in part on the motion.

16. The computer-implemented method of claim 6, wherein the determining that the second object corresponds to the first object comprises determining that the distance is below a threshold distance.

17. One or more non-transitory computer-readable media storing instructions executable by one or more processors, wherein the instructions, when executed, cause the one or more processors to perform operations comprising:
receiving, from a sensor associated with a vehicle, first data;
determining, based at least in part on the first data, a first subset of data associated with a first object;
inputting the first subset of data into a neural network;
receiving, from the neural network and based at least in part on the first subset of data, an output associated with a first n-dimensional representation;
receiving, from the sensor associated with the vehicle, second data;
determining, based at least in part on the second data, a second subset of data associated with a second object;
inputting the second subset of data into the neural network;
receiving, from the neural network and based at least in part on the second subset of data, a second n-dimensional representation;
determining, based at least in part on a distance between the first n-dimensional representation and the second n-dimensional representation, that the second object represented in the second data corresponds to the first object represented in the first data;
determining, based at least in part on the second object corresponding to the first object, one or more of a velocity or an orientation of the first object; and
controlling the vehicle based at least in part on one or more of the velocity of the first object or the orientation of the first object.

18. The one or more non-transitory computer-readable media of claim 17, wherein the first n-dimensional representation and the second n-dimensional representation are associated with multiple classes of objects, and wherein the operations further comprise:
determining, from the multiple classes of objects and based at least in part on the first n-dimensional representation, a classification associated with the first object.

19. The one or more non-transitory computer-readable media of claim 18, wherein determining the classification comprises determining a smallest classification distance between the first n-dimensional representation and classification embeddings associated with the multiple classes of objects.

20. The one or more non-transitory computer-readable media of claim 19, the operations further comprising:
training the neural network, the training comprising:
inputting a triplet group of image portions into the neural network, the triplet group of image portions comprising:
a first image portion representing a portion of a third object, the first image portion associated with a third n-dimensional representation;
a second image portion representing a portion of a fourth object, the second image portion associated with a fourth n-dimensional representation; and
a third image portion representing a fifth object that is different than the third object and the fourth object, the third image portion associated with a fifth n-dimensional representation; and
adjusting a parameter associated with the neural network to one or more of increase a first distance from the fifth n-dimensional representation to the third n-dimensional representation or decrease a second distance from the fourth n-dimensional representation to the third n-dimensional representation.

\* \* \* \* \*